US012724884B2

(12) United States Patent
Itzhak et al.

(10) Patent No.: US 12,724,884 B2
(45) Date of Patent: Sep. 1, 2026

(54) ADAPTIVE INCIDENT PRIORITIZATION BASED ON USER FEEDBACK

(71) Applicant: PALO ALTO NETWORKS (ISRAEL ANALYTICS) LTD., Tel Aviv (IL)

(72) Inventors: Gal Itzhak, Holon (IL); Yinnon Meshi, Kibbutz Revivim (IL); Tuvia Newman, Kiryat Gat (IL); Niv Sela, Tel Aviv (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 18/731,420

(22) Filed: Jun. 3, 2024

(65) Prior Publication Data

US 2025/0371145 A1 Dec. 4, 2025

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ......................... G06F 21/554; G06F 2221/034
See application file for complete search history.

(56) References Cited

U.S. PATENT DOCUMENTS 7,003,790 B1 2/2006 Inoue et al.
7,007,301 B2 2/2006 Crosbie et al.
7,684,568 B2 3/2010 Yonge, III et al.
8,516,586 B1 8/2013 Jensen et al.
8,578,345 B1 11/2013 Kennedy et al.
(Continued)

FOREIGN PATENT DOCUMENTS

CA 3041875 A1 11/2019
CN 1612532 A 5/2005
(Continued)

OTHER PUBLICATIONS

U.S. Appl. No. 17/571,558 Office Action dated Jun. 26, 2023.
(Continued)

*Primary Examiner* — Jung W Kim
*Assistant Examiner* — James P Moles
(74) *Attorney, Agent, or Firm* — Meitar Patents LTD.; Daniel Kligler

(57) ABSTRACT

A computer-implemented method for prioritizing security incidents includes maintaining one or more pre-trained Artificial Intelligence (AI) models that, when applied to features extracted from computer-system security incidents, produce a prioritization among the security incidents. An iterative process is run for each computer system among a plurality of computer systems. The iterative process includes detecting one or more security incidents occurring in the computer system, extracting features from the detected incidents, applying the one or more pre-trained AI models to the extracted features so as to produce a computer-system-specific prioritization, presenting the computer-system-specific prioritization to a user of the computer system, receiving user feedback that is indicative of a quality of the computer-system-specific prioritization, as decided by the user of the computer system, and adjusting subsequent extraction of the features, for the computer system, based on the user feedback.

15 Claims, 4 Drawing Sheets

(56) References Cited

U.S. PATENT DOCUMENTS 9,118,582 B1 8/2015 Martini
9,319,421 B2 4/2016 Ferragut et al.
9,531,736 B1 12/2016 Torres et al.
9,686,299 B2 6/2017 Stevenson
9,690,933 B1 6/2017 Singh et al.
9,773,112 B1 9/2017 Rathor et al.
10,181,032 B1 1/2019 Sadaghiani et al.
10,360,367 B1 7/2019 Mossoba et al.
10,587,642 B1 * 3/2020 Herman-Saffar ... H04L 63/1416
10,706,144 B1 7/2020 Moritz et al.
10,728,262 B1 7/2020 Vaswani et al.
10,873,596 B1 12/2020 Bourget et al.
10,904,277 B1 1/2021 Mehr
11,100,199 B2 8/2021 Subramaniam
11,140,194 B2 10/2021 Hecht
11,184,376 B2 11/2021 Meshi et al.
11,316,872 B2 4/2022 Meshi et al.
11,501,261 B1 11/2022 Schemers et al.
11,637,861 B2 4/2023 Burle et al.
12,045,610 B1 7/2024 Myers et al.
12,380,389 B2 8/2025 Schmidt et al.
2004/0199793 A1 10/2004 Wilken et al.
2005/0015624 A1 1/2005 Ginter et al.
2005/0018618 A1 1/2005 Mualem et al.
2005/0069130 A1 3/2005 Kobayashi
2005/0071330 A1 3/2005 Douceur et al.
2005/0123138 A1 6/2005 Abe et al.
2005/0183120 A1 8/2005 Jain et al.
2005/0262556 A1 11/2005 Waisman et al.
2006/0190803 A1 8/2006 Kawasaki et al.
2007/0011319 A1 1/2007 McClure et al.
2007/0073519 A1 3/2007 Long
2007/0116277 A1 5/2007 Ro et al.
2007/0124474 A1 5/2007 Margulis
2007/0201691 A1 8/2007 Kumagaya
2007/0201693 A1 8/2007 Ohno
2008/0013725 A1 1/2008 Kobayashi
2008/0244097 A1 10/2008 Candelore et al.
2008/0301567 A1 12/2008 Martin et al.
2010/0014594 A1 1/2010 Beheydt et al.
2010/0146292 A1 6/2010 Shi et al.
2010/0146293 A1 6/2010 Shi et al.
2010/0146501 A1 6/2010 Wyatt et al.
2010/0272257 A1 10/2010 Beals
2011/0135090 A1 6/2011 Chan et al.
2011/0138463 A1 6/2011 Kim et al.
2011/0271343 A1 11/2011 Kim et al.
2011/0317770 A1 12/2011 Lehtiniemi et al.
2012/0308008 A1 12/2012 Kondareddy et al.
2013/0061045 A1 3/2013 Kiefer et al.
2014/0010367 A1 1/2014 Wang
2014/0201776 A1 7/2014 Minemura et al.
2014/0215619 A1 7/2014 Lee
2015/0026810 A1 1/2015 Friedrichs et al.
2015/0156270 A1 6/2015 Teraoka et al.
2015/0180883 A1 6/2015 Aktas et al.
2015/0207694 A1 7/2015 Inches et al.
2015/0295903 A1 10/2015 Yi et al.
2015/0324188 A1 11/2015 Raje et al.
2015/0356451 A1 12/2015 Gupta et al.
2016/0028758 A1 1/2016 Ellis et al.
2016/0119292 A1 4/2016 Kaseda et al.
2016/0142746 A1 5/2016 Schuberth
2016/0234167 A1 8/2016 Engel et al.
2016/0359895 A1 12/2016 Chiu et al.
2017/0007128 A1 1/2017 Takano et al.
2017/0171229 A1 6/2017 Arzi et al.
2017/0171231 A1 6/2017 Reybok et al.
2017/0289178 A1 10/2017 Roundy et al.
2017/0294112 A1 10/2017 Kushnir
2017/0374090 A1 12/2017 McGrew et al.
2018/0007013 A1 1/2018 Wang
2018/0048662 A1 2/2018 Jang et al.
2018/0077189 A1 3/2018 Doppke et al.
2018/0124077 A1 5/2018 Carver et al.
2018/0288081 A1 10/2018 Yermakov
2018/0332064 A1 11/2018 Harris et al.
2018/0365416 A1 12/2018 Monastyrsky et al.
2018/0373820 A1 12/2018 Knezevic et al.
2019/0034641 A1 1/2019 Gil et al.
2019/0036978 A1 1/2019 Shulman-Peleg et al.
2019/0044965 A1 2/2019 Pilkington et al.
2019/0068620 A1 2/2019 Avrahami et al.
2019/0075344 A1 3/2019 Brown
2019/0098025 A1 * 3/2019 Lim ....................... G06N 20/00
2019/0207966 A1 7/2019 Vashisht et al.
2019/0297097 A1 9/2019 Gong et al.
2020/0033144 A1 * 1/2020 Du ........................ H04W 4/024
2020/0082296 A1 3/2020 Fly et al.
2020/0136889 A1 4/2020 Chen et al.
2020/0162252 A1 5/2020 Davis et al.
2020/0162494 A1 5/2020 Rostami-Hesarsorkh
2020/0274894 A1 8/2020 Argoeti et al.
2020/0285737 A1 9/2020 Kraus et al.
2020/0293917 A1 9/2020 Wang et al.
2020/0311260 A1 10/2020 Klonowski et al.
2020/0327221 A1 10/2020 Street
2020/0327225 A1 10/2020 Nguyen et al.
2020/0342230 A1 10/2020 Tsai et al.
2020/0374301 A1 11/2020 Manevich et al.
2021/0004458 A1 1/2021 Edwards et al.
2021/0084063 A1 3/2021 Triantafillos et al.
2021/0176261 A1 6/2021 Yavo et al.
2021/0182387 A1 6/2021 Zhu et al.
2021/0209228 A1 7/2021 Maor et al.
2021/0224676 A1 7/2021 Arzani et al.
2021/0248503 A1 8/2021 Hickey et al.
2021/0264028 A1 8/2021 Genc et al.
2021/0266339 A1 8/2021 Moshitzky et al.
2021/0304204 A1 9/2021 Ramesh et al.
2022/0086178 A1 3/2022 Jayamohan et al.
2022/0129551 A1 4/2022 Collier et al.
2022/0138856 A1 5/2022 Ahlstrom et al.
2023/0007023 A1 * 1/2023 Andrabi .............. H04L 63/1425
2023/0075355 A1 3/2023 Twigg et al.
2023/0114821 A1 4/2023 Thomas et al.
2023/0117120 A1 4/2023 Johnson
2023/0129144 A1 4/2023 Neil et al.
2023/0164039 A1 * 5/2023 Vadlamani .......... H04L 41/5009 709/224
2023/0229771 A1 7/2023 Sameer et al.
2023/0403294 A1 12/2023 Bazalgette et al.
2024/0095350 A1 3/2024 Withnell et al.
2024/0126910 A1 4/2024 Johnson et al.
2024/0289461 A1 8/2024 Ko et al.
2024/0303529 A1 9/2024 Rane et al.
2024/0338489 A1 10/2024 Zhu et al.
2024/0340306 A1 10/2024 Staab et al.
2024/0378423 A1 11/2024 Gunnai et al.
2024/0380766 A1 11/2024 Shachar et al.
2024/0386015 A1 11/2024 Crabtree et al.
2024/0414178 A1 * 12/2024 Neuvirth-Telem .......................... H04L 63/1433
2025/0007882 A1 1/2025 Akhtar et al.
2025/0094585 A1 3/2025 Wuest et al.
2025/0173431 A1 5/2025 Divakaran et al.
2025/0181718 A1 6/2025 Saqib et al.
2025/0217479 A1 7/2025 Palanki
2025/0247402 A1 7/2025 Singla
2025/0260712 A1 * 8/2025 Hong .................. H04L 63/1416
2026/0003963 A1 1/2026 Olszak et al.

FOREIGN PATENT DOCUMENTS

CN 101536455 A 9/2009
CN 103561048 A 2/2014
CN 106131050 A 11/2016
CN 114640507 A 6/2022
CN 109104395 A 8/2022
CN 115396324 A 11/2022
CN 116074031 A 5/2023
GB 0401420 2/2004
JP 2009111448 A 5/2009

(56) References Cited

FOREIGN PATENT DOCUMENTS

OTHER PUBLICATIONS

U.S. Appl. No. 17/676,275 Office Action dated Feb. 29, 2024.
Xu, "Correlation Analysis of Intrusion Alerts," Dissertation in Computer Science submitted to the Graduate Faculty, North Carolina State University, pp. 1-206, year 2006.
U.S. Appl. No. 17/038,285 Office Action dated Mar. 21, 2022.
U.S. Appl. No. 17/175,720 Office Action dated Nov. 7, 2022.
U.S. Appl. No. 17/506,713 Office Action dated Nov. 8, 2022.
Brownlee et al., "Traffic Flow Measurement: Architecture," Request for Comments 2722, Network Working Group, pp. 1-48, Oct. 1999.
International Application # PCT/IB2022/059544 Search Report dated Jan. 20, 2023.
International Application # PCT/IB2022/060920 Search Report dated Feb. 7, 2023.
EP Application # 19832439.4 Office Action dated Mar. 1, 2023.
U.S. Appl. No. 17/175,720 Office Action dated Mar. 20, 2023.
International Application # PCT/IB2022/061926 Search Report dated Mar. 27, 2023.
U.S. Appl. No. 17/464,716 Office Action dated Apr. 14, 2023.
U.S. Appl. No. 17/464,709 Office Action dated Apr. 14, 2023.
U.S. Appl. No. 18/361,850 Office Action dated May 3, 2025.
U.S. Appl. No. 17/676,275 Office Action dated Jun. 16, 2025.
U.S. Appl. No. 18/357,121 Office Action dated May 2, 2025.
CN Application # 201980090243X Office Action dated Nov. 30, 2022.
U.S. Appl. No. 17/505,673 Office Action dated Sep. 25, 2023.
AU Application # 2021351215 Office Action dated Nov. 28, 2023.
Non-Final Office Action, U.S. Appl. No. 18/361,850, dated Dec. 30, 2025.
Final Office Action for U.S. Appl. No. 18/357,121, dated Oct. 23, 2025.
Notice of References Cited for U.S. Appl. No. 18/357,121, dated Oct. 23, 2025.
Non-Final Office Action for U.S. Appl. No. 18/661,626, dated Oct. 1, 2025.
Notice of References Cited for U.S. Appl. No. 18/661,626, dated Oct. 1, 2025.
Final Office Action, U.S. Appl. No. 18/361,850 dated Sep. 30, 2025.
Notice of References Cited for U.S. Appl. No. 18/361,850, dated Sep. 30, 2025.
Non Final US Office Action, U.S. Appl. No. 18/783,523, dated Oct. 21, 2025.
Notice of References cited, U.S. Appl. No. 18/783,523, dated Oct. 21, 2025.
Australian Application No. 2022441431, Examination report No. 1 dated Jul. 3, 2025.
First Office Action, Chinese Application No. 202310649492.6, dated Jul. 24, 2025.
Decision on Appeal (Appeal 2024-003437) for U.S. Appl. No. 17/700,579, dated Jul. 30, 2025.
Non-Final Office Action for U.S. Appl. No. 18/499,256, dated Aug. 18, 2025.
Non-Final Office Action for U.S. Appl. No. 18/322,231, dated Sep. 30, 2025.
Notice of References Cited for U.S. Appl. No. 18/322,231, dated Sep. 30, 2025.
Notice of References Cited, U.S. Appl. No. 18/322,231, dated Mar. 5, 2025.
Non-Final Office Action, U.S. Appl. No. 18/914,180, dated Mar. 4, 2026.
Notice of References Cited, U.S. Appl. No. 18/914,180, dated Mar. 4, 2026.
International Search Report and Written Opinion, # PCT/US2026/021401, dated May 29, 2026.

* cited by examiner

ADAPTIVE INCIDENT PRIORITIZATION BASED ON USER FEEDBACK

FIELD OF THE INVENTION

The present invention relates generally to cyber security, and particularly to methods and systems for prioritization of security incidents.

BACKGROUND OF THE INVENTION

Protection against security hazards in a computer system typically involves detecting incidents occurring in the system, distinguishing between malicious and benign incidents, and acting upon the incidents regarded as malicious. In practice, the number and complexity of incidents that need to be processed may be extremely large, calling for intelligent prioritization.

SUMMARY OF THE INVENTION

An embodiment of the present invention that is described herein provides a computer-implemented method for prioritizing security incidents. The method includes maintaining one or more pre-trained Artificial Intelligence (AI) models that, when applied to features extracted from computer-system security incidents, produce a prioritization among the security incidents. An iterative process is run for each computer system among a plurality of computer systems. The iterative process includes detecting one or more security incidents occurring in the computer system, extracting features from the detected incidents, applying the one or more pre-trained AI models to the extracted features so as to produce a computer-system-specific prioritization, presenting the computer-system-specific prioritization to a user of the computer system, receiving user feedback that is indicative of a quality of the computer-system-specific prioritization, as decided by the user of the computer system, and adjusting subsequent extraction of the features, for the computer system, based on the user feedback.

In some embodiments, running the iterative process includes producing different computer-system-specific prioritizations for different ones of the computer systems, in spite of using the same one or more pre-trained AI models. In disclosed embodiments, extracting the features includes assigning respective precision measures to one or more of the features, and adjusting the subsequent extraction of the features includes adjusting the precision measures in response to the user feedback.

In some embodiments, for a given computer system in the plurality, adjusting the subsequent extraction of the features is performed based on both (i) the user feedback received for the given computer system, and (ii) the user feedback received for one or more other computer systems in the plurality. In an embodiment, adjusting the subsequent extraction of the features includes preventing distortion in the feature extraction of a given computer system due to the user feedback in another computer system.

There is additionally provided, in accordance with an embodiment of the present invention, an apparatus for prioritizing security incidents. The apparatus includes a memory and one or more processors. The memory is configured to store one or more pre-trained Artificial Intelligence (AI) models that, when applied to features extracted from computer-system security incidents, produce a prioritization among the security incidents. The one or more processors are configured to run, for each computer system among a plurality of computer systems, an iterative process that includes (i) detecting one or more security incidents occurring in the computer system, (ii) extracting features from the detected incidents, (iii) applying the one or more pre-trained AI models to the extracted features, to produce a computer-system-specific prioritization, (iv) presenting the computer-system-specific prioritization to a user of the computer system, (v) receiving user feedback that is indicative of a quality of the computer-system-specific prioritization, as decided by the user of the computer system, and (vi) adjusting subsequent extraction of the features, for the computer system, based on the user feedback.

There is also provided, in accordance with an embodiment of the present invention, a computer software product, the product including a tangible non-transitory computer-readable medium in which program instructions are stored, which instructions, when read by one or more processors, cause the one or more processors to maintain one or more pre-trained Artificial Intelligence (AI) models that, when applied to features extracted from computer-system security incidents, produce a prioritization among the security incidents, and, for each computer system among a plurality of computer systems, to run an iterative process that includes (i) detecting one or more security incidents occurring in the computer system, (ii) extracting features from the detected incidents, (iii) applying the one or more pre-trained AI models to the extracted features, to produce a computer-system-specific prioritization, (iv) presenting the computer-system-specific prioritization to a user of the computer system, (v) receiving user feedback that is indicative of a quality of the computer-system-specific prioritization, as decided by the user of the computer system, and (vi) adjusting subsequent extraction of the features, for the computer system, based on the user feedback.

The present invention will be more fully understood from the following detailed description of the embodiments thereof, taken together with the drawings in which:

DETAILED DESCRIPTION OF EMBODIMENTS

Overview

Figure 1:
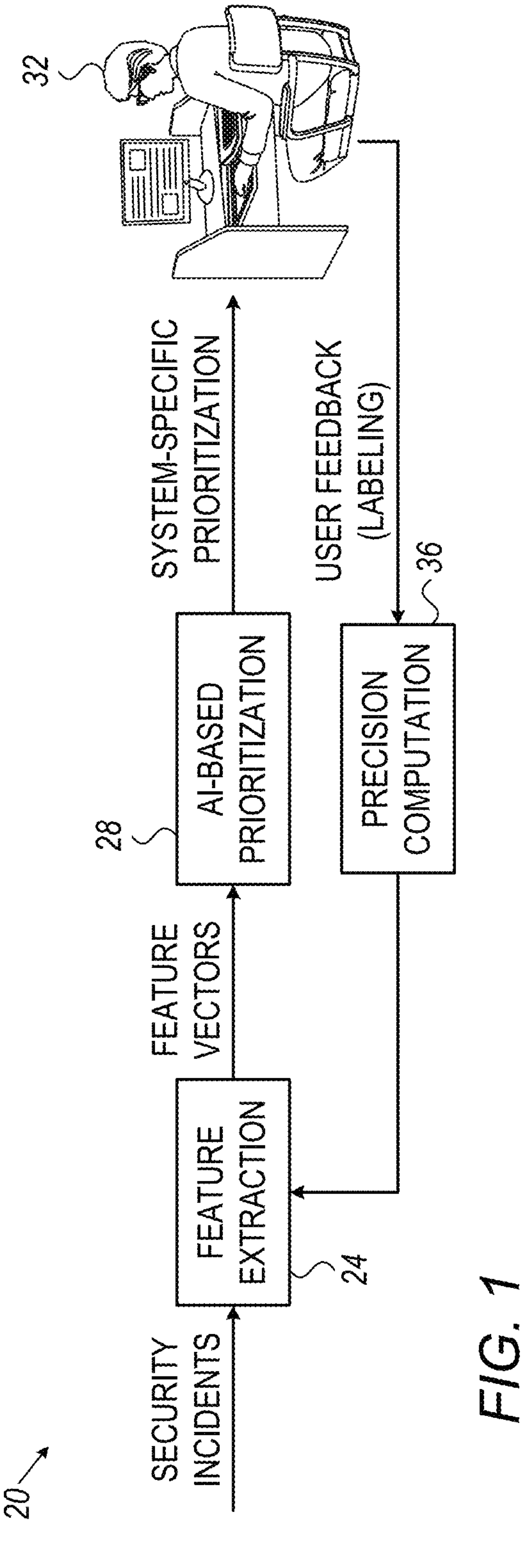
FIG. 1 is a block diagram that schematically illustrates a system for prioritization of security incidents based on system-specific user feedback, in accordance with an embodiment of the present invention.

Embodiments of the present invention that are described herein provide improved methods and systems for prioritizing security incidents occurring in computer systems. In the present context, the term "security incident" refers to an event or group of events that may be indicative of malware or other security hazard. The phrase "prioritizing security incidents", or simply "prioritization", in various grammatical forms, refers to assigning relative or absolute levels of priority, e.g., importance, relevance, sensitivity, preference, urgency and/or severity, to security incidents.

An effective way of prioritizing security incidents is to use one or more Artificial Intelligence (AI) models that are pre-trained for this purpose. However, deploying AI models on a large scale, e.g., across multiple different computer systems, is challenging.

On one hand, it is highly desirable to use the same set of AI models, without system-specific training, across multiple different computer systems. Such uniformity is important for both performance and management/maintenance reasons. On the other hand, computer systems may differ significantly from one another in the importance, relevance, urgency and/or severity they attribute to the same security incidents. For example, different computer systems may be operated by very different organizations or other entities, and may differ in functionality, size and other characteristics. As such, security incidents that are dramatic in one computer system may be irrelevant in another computer system.

Embodiments of the present invention fulfil both requirements—The requirement for AI model uniformity, and the requirement for system-specific prioritization. As will be described in detail herein, in some embodiments the same set of pre-trained AI models is used for prioritizing security incidents in a plurality of different computer systems. Using the same pre-trained AI models, the disclosed techniques generate, for each computer system, a system-specific prioritization that matches the individual requirements or circumstances of that system. This seemingly self-contradictory result is achieved by adapting the feature extraction process in each computer system, rather than the AI models, based on system-specific user feedback.

In some embodiments, an on-going, iterative prioritization process is performed in each computer system. In each system, security incidents are detected, features are extracted from the detected security incidents, and the set of pre-trained AI models is applied to the extracted features. The AI models produce a prioritization among at least some of the security incidents. The prioritization is presented to a user of the computer system, e.g., to a Security Operations Center (SOC) operator. The user provides feedback ("labeling") as to the quality, e.g., accuracy, of the presented prioritization.

This feedback is system-specific, in the sense that users of different computer systems may provide different feedback when presented with the same prioritization. The system-specific user feedback is used to adjust the feature extraction for subsequent security incidents. In this manner, the prioritization is optimized separately for each computer system, even though all computer systems use the same AI models without system-specific training.

In some embodiments the user-feedback-based adaptation in a given computer system is based solely on local user feedback (i.e., only on user feedback from the same system). In other embodiments, the adaptation depends both on local user feedback and on global user feedback (i.e., user feedback from one or more other computer systems).

System Description

FIG. 1 is a block diagram that schematically illustrates a system 20 for prioritization of security incidents based on system-specific user feedback, in accordance with an embodiment of the present invention. System 20 prioritizes security incidents that occur in a respective computer system (not seen in the figure). Multiple systems 20 may be operated for multiple different computer systems. In some embodiments, each system 20 is collocated with the corresponding computer system. In other embodiments, multiple instances of system 20, for multiple different computer systems, are deployed jointly, e.g., in a cloud-based implementation.

System 20 comprises a feature extraction module 24, an AI-based prioritization module 28 and a precision computation module 36. Modules 24, 28 and 36 may run on one or more processors, locally and/or remotely from the computer system.

In a typical mode of operation, system 20 continually receives indications of security incidents occurring in the computer system. As noted above, a security incident may comprise an event, or a group of events, occurring in the computer system. Security events and incidents may be received, for example, from software agents running in the various components of the computer system, e.g., endpoints, servers, network elements and the like, from security systems of the computer system, e.g., firewall, or from any other suitable source. Grouping of events to form incidents can be performed in any suitable way.

Feature extraction module 24 extracts predefined features from each received security incident. For each security incident, module 24 produces a respective "feature vector"—A vector whose elements correspond to the features. The value of a certain vector element is indicative of a score attributed to the feature in that incident. The scores of some features may be Boolean (i.e., "True" or "False"). The scores of other features may be numerical values within a suitable range.

Prioritization module 28 applies a set of one or more pre-trained AI models to the feature vectors, thereby producing a prioritization among at least some of the security incidents. Typically, when deploying multiple instances of system 20 for multiple computer systems, all instances of module 28 use the same set of AI models without any system-specific training. In other embodiments, a certain amount of variation in the AI models, e.g., a certain amount of system-specific training, is permitted for different computer systems.

The prioritization generated by module 28 is presented to a user 32 of the computer system. User 32 is typically a computer-security-related person, e.g., a SOC operator. The prioritization may be presented to the user in any suitable form. One example form is a list of security incidents that is sorted in descending order of priority (e.g., from the most severe/urgent/relevant to the least severe/urgent/relevant). The user may also be presented with attributes relating to the presented incidents, e.g., severity scores.

User 32 provides feedback as to the quality of the prioritization generated by the AI models. This feedback is also referred to herein as "user labeling" or simply "labeling". The user feedback may also take any suitable form. For example, user 32 may enter Boolean "True"/"False" indications for any of the prioritized incidents, wherein a "True" indication indicates the user agrees with the automated prioritization, and a "False" indication indicates the user disagrees with the automated prioritization. As another example, the user may delete some of the presented incidents, indicating they are irrelevant. As yet another example, the user may rearrange the order of incidents on the list, e.g., pull an incident up the list to promote its priority, or push an incident down the list to demote it.

The user feedback is provided to precision computation module 36, which adapts the operation of feature extraction module 24 based on the feedback. For example, module 36 may define scaling factors that up-scale or down-scale the precision of certain features, depending on the user feedback. The extraction of features for subsequent incidents will therefore depend on the user feedback. In this manner, the prioritization generated by module 28 gradually becomes system-specific, even though the AI models being used are the same for all computer systems.

In various embodiments, feature extraction can be adapted in any suitable way based on the system-specific user feedback. Consider, for example, a specific security incident that occurs multiple times in two different computer systems. In one computer system, user 32 labels 90% of the occurrences of this incident as "malicious" (i.e., true positive) and 10% as "benign" (i.e., false positive). In the other computer system, user 32 labels only 20% of the occurrences of this incident as "malicious" (true positive) and 80% of the occurrences as "benign" (false positive). Based on such user feedback, precision computation module 36 in the first system will assign the features of the incident in question a high precision. In the second system, module 36 will assign the features of the incident a low precision.

Figure 2:
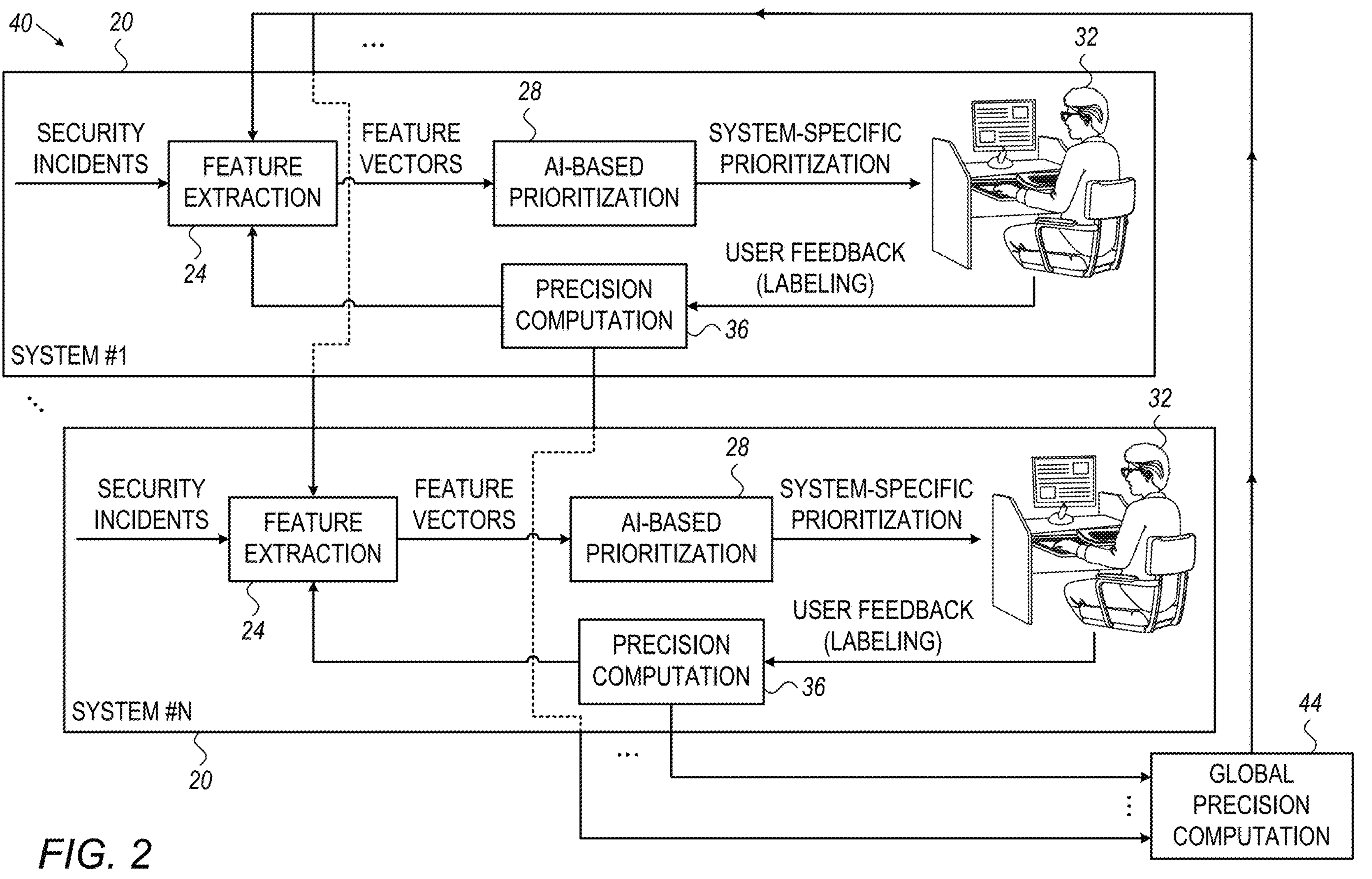
FIG. 2 is a block diagram that schematically illustrates a system for prioritization of security incidents based on both local and global system-specific user feedback, in accordance with an embodiment of the present invention.

FIG. 2 is a block diagram that schematically illustrates a system 40 for prioritization of security incidents based on both local and global system-specific user feedback, in accordance with an embodiment of the present invention. System 40 comprises multiple prioritization systems 20 denoted "System #1"-"System #N". Each system 20 is assigned to prioritize security incidents occurring in a respective computer system. The number of computer systems, and thus the number of prioritization systems 20, may be any suitable number. It is not uncommon for this number to be in the order of several thousands.

Each system 20 of FIG. 2 operates similarly to system 20 of FIG. 1, as described above. In the present example, however, the system-specific prioritization of the security incidents in a given system 20 is based on both local user feedback (feedback from the user of the given computer system) and global user feedback (feedback from users of one or more other computer systems, typically all other computer systems).

To provide global user feedback, system 40 comprises a global precision computation module 44. Module 44 receives precision computations from modules 36 of the various systems 20. Based on these inputs, module 44 generates global precision values for at least some features. The global precision values are fed-back to feature extraction modules 24 of the various systems 20.

Thus, feature extraction module 24 in a given system 20 is able to adapt its feature extraction process based on (i) local user feedback provided locally by module 36, and (ii) global user feedback provided by module 44. A given module 24 may combine the local and global user feedback in any suitable way, e.g., by assigning relative weights to the local and global feedback.

In various embodiments, local precision computation modules 36 and global precision computation module 44 may calculate the local and global precision values in any suitable way. Consider, for example, a certain alert that appears in various incidents across the multiple computer systems. Module 36 may calculate the local precision of the alert (the system-specific precision of the alert in a given computer system) as the ratio between (i) the number of incidents in the given computer system in which the alert is involved and that were labeled "true positive" by user 32 of the given computer system, and (ii) the total number of incidents in the given computer system in which the alert is involved. Module 36 typically ensures that sufficient statistics are gathered (e.g., a sufficient number of labeled incidents containing the same alert) to guarantee the computed precision is statistically significant.

In various embodiments, feature extraction modules 24 may use various techniques for converting precision into a numerical feature. For example, module 24 may quantize the real-valued alert precision into a small set of binned values (e.g., Precision<20%→"0"; 20%≤Precision<40%→"1", etc.). The binning technique is flexible and may be adapted depending on the model(s) being used.

One family of alerts, whose relevance typically varies considerably from one computer to another, has to do with user-behavior or identity-threat alerts. Consider, for example, an alert concerning connection to a previously unencountered country/ASN, or an alert concerning a first/unusual VPN access from a country in the organization. Such alerts could be very valuable or suspicious for conservative or local organizations in which traveling abroad, working remotely and actively collaborating with partners worldwide are uncommon. In contrast, the same alerts could be less significant for multinational organizations in which worldwide partnerships and traveling are common. Depending on the system-specific feedback from user 32, the computed precisions (and their corresponding binned features) can be adapted. As a consequence, the scores of successive incidents involving the same alerts would be affected accordingly.

In various embodiments, precision computation modules 36 and 44 may specify precision measures for various data fields ("entities"). For example, precision may be specified for a particular alert, for a particular combination of alerts, for a particular user (i.e., how common it is for the user to be involved in suspicious incidents), and/or for any other suitable entity.

In some embodiments, global precision computation module 44 employs measures to prevent local precision values from overly distorting the global precision values. For example, if all alerts are given equal weight in the global precision, a very large computer system has the potential of significantly influencing the global precision (and in turn distorting the feature extraction in other computer systems). To avoid such scenarios, but still give large systems more weight than small systems, global precision computation module 44 may consider various statistical measures in calculating global precision values. For example, module 44 may consider the raw global precision (a precision calculated by aggregating all incidents globally), the average of all local precisions, the percentiles (including medians) of the local precisions, etc. Utilizing these measures, module 44 is able to detect and compensate for undesirable distortion of the global precision computation.

Prioritization Method Description

Figure 3:
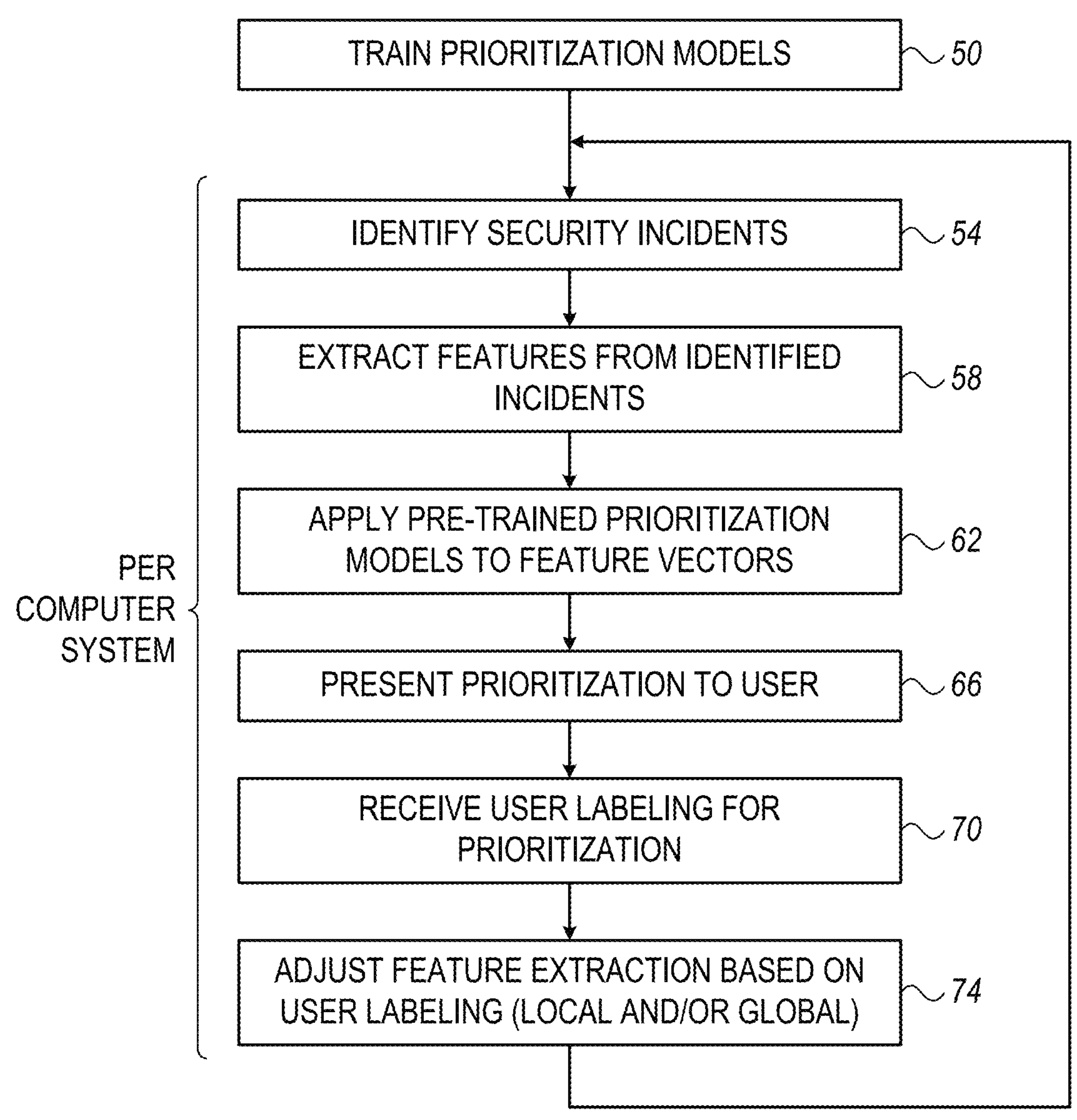
FIG. 3 is a flow chart that schematically illustrates a method for prioritization of security incidents based on system-specific user feedback, in accordance with an embodiment of the present invention.

FIG. 3 is a flow chart that schematically illustrates a method for prioritization of security incidents based on system-specific user feedback, in accordance with an embodiment of the present invention. The method begins by training a set of one or more AI models to prioritize security incidents, at a training stage 50. The training process may be performed by any suitable computer, either internal or external to the computer systems that will subsequently be protected by the trained models.

In the present example the training phase (stage 50) ends, and is then followed by an ongoing prioritization adaptation process (stages 54-74 below). In practice, however, additional training (typically global training, not system-specific training) may be performed in parallel to the prioritization adaptation.

The ongoing prioritization adaptation process (stages 54-74) is typically performed separately in each prioritization system 20, although, as described above, user feedback from one system 20 can be used for adaptation in another system 20.

At an incident identification stage 54, the computer system identifies security incidents occurring therein. The identified incidents are reported to prioritization system 20. In system 20, feature extraction module 24 generates a feature vector per incident, at a feature extraction stage 58. At a prioritization generation stage 62, prioritization module 28 generates a system-specific prioritization among at least some of the security incidents, by applying the pre-trained AI models.

At a presentation stage 66, system 20 presents the system-specific prioritization to user 32 of the computer system. At a feedback input stage 70, system 20 receives user feedback ("user labeling") for the presented prioritization. At a prioritization adaptation stage 74, precision computation module 36 adapts the precision of at least some of the features based on the user feedback. The adapted precision values are provided to feature extraction module 24, for use in extracting features from subsequent security incidents. The method then loops back to stage 54 above.

EXAMPLE IMPLEMENTATION

Figure 4:
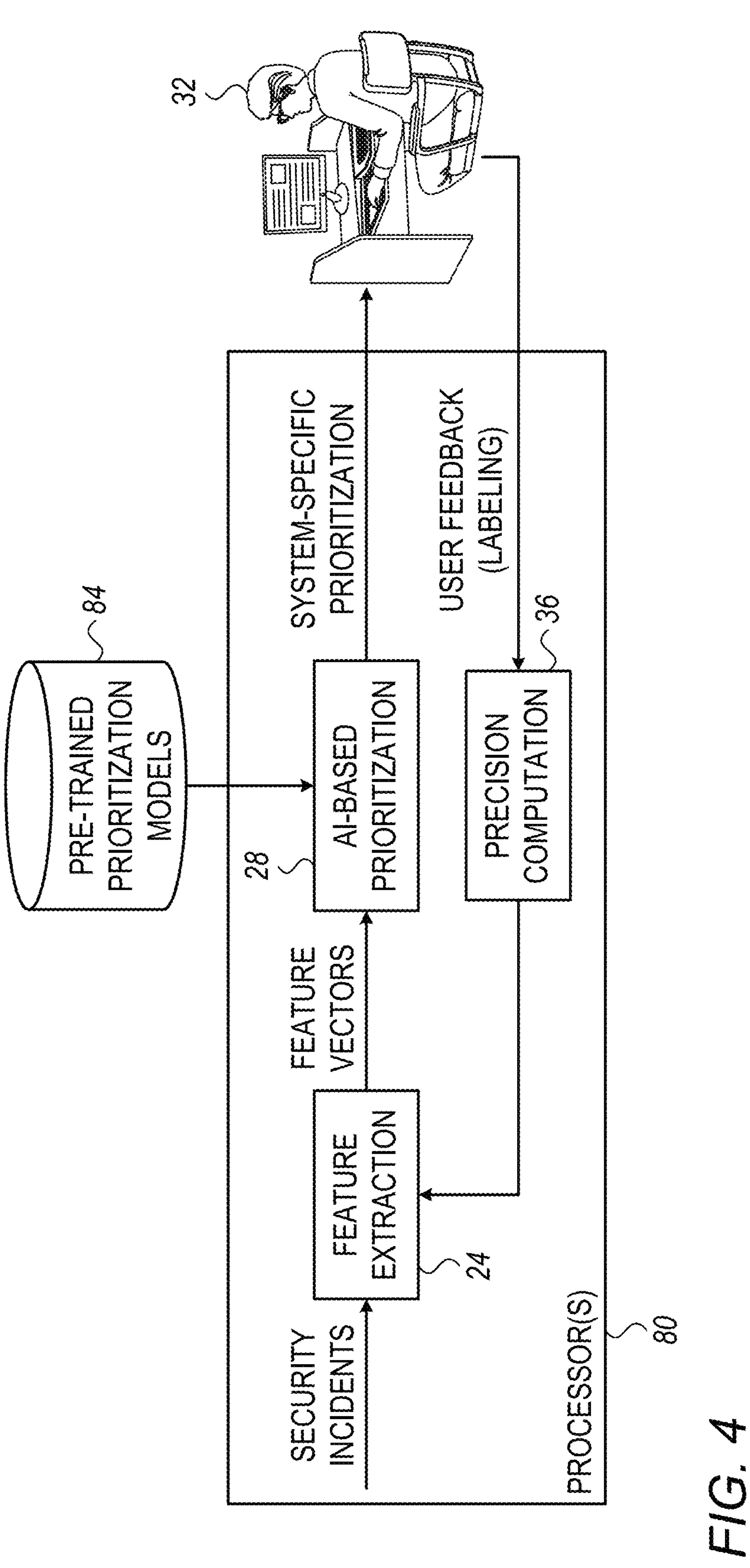
FIG. 4 is a block diagram that schematically illustrates an example implementation of the system of FIG. 1, in accordance with an embodiment of the present invention.

FIG. 4 is a block diagram that schematically illustrates an example implementation of prioritization system 20 of FIG. 1, in accordance with an embodiment of the present invention. The prioritization system of FIG. 4 comprises one or more processors 80 and a memory 84. Processors 80 carry out the tasks of feature extraction module 24, prioritization module 28 and precision computation module 36. Memory 84 is used for storing the AI models used in the prioritization. When using multiple processors 80, any task partitioning ("division of labor") can be used among the processors.

Similarly, one or more processors 80 can be used for implementing prioritization system 40 of FIG. 2 above. In an example embodiment, a single processor 80 carries out the tasks of the various feature extraction modules 24, prioritization modules 28 and precision computation modules 36 of "System #1"-"System #N". In another embodiment, the tasks of each system 20 are carried out by a separate processor 80. Further alternatively, any other assignment of processors to tasks can be used.

The prioritization system configurations shown in FIGS. 1, 2 and 4 are example configurations that are chosen purely for the sake of conceptual clarity. In alternative embodiments, any other suitable configuration can be used. Elements that are not necessary for understanding the principles of the present invention have been omitted from the figures for clarity.

The various prioritization system elements may be implemented in hardware, e.g., in one or more Application-Specific Integrated Circuits (ASICs) or FPGAs, in software, or using a combination of hardware and software elements. Memory 84 (FIG. 4) may comprise any suitable type of memory, e.g., Random-Access Memory (RAM).

Any of processors 80 (FIG. 4) may comprise a general-purpose processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer-implemented method for prioritizing security incidents, the method comprising:

maintaining one or more pre-trained Artificial Intelligence (AI) models that, when applied to features extracted from computer-system security incidents, produce a prioritization among the security incidents; and for each computer system among a plurality of computer systems, running an iterative process that includes:

detecting one or more security incidents occurring in the computer system;

extracting features from the detected incidents;

applying the one or more pre-trained AI models to the extracted features, to produce a computer-system-specific prioritization;

presenting the computer-system-specific prioritization to a user of the computer system;

receiving user feedback that is indicative of a quality of the computer-system-specific prioritization, as decided by the user of the computer system; and adjusting subsequent extraction of the features, for the computer system, based on the user feedback.

2. The method according to claim 1, wherein running the iterative process comprises producing different computer-system-specific prioritizations for different ones of the computer systems, in spite of using the same one or more pre-trained AI models.

3. The method according to claim 1, wherein extracting the features comprises assigning respective precision measures to one or more of the features, and wherein adjusting the subsequent extraction of the features comprises adjusting the precision measures in response to the user feedback.

4. The method according to claim 1, wherein, for a given computer system in the plurality, adjusting the subsequent extraction of the features is performed based on both (i) the user feedback received for the given computer system, and (ii) the user feedback received for one or more other computer systems in the plurality.

5. The method according to claim 4, wherein adjusting the subsequent extraction of the features comprises preventing distortion in the feature extraction of a given computer system due to the user feedback in another computer system.

6. An apparatus for prioritizing security incidents, the apparatus comprising:

a memory, configured to store one or more pre-trained Artificial Intelligence (AI) models that, when applied to features extracted from computer-system security incidents, produce a prioritization among the security incidents; and one or more processors, configured to run, for each computer system among a plurality of computer systems, an iterative process that includes:

detecting one or more security incidents occurring in the computer system;

extracting features from the detected incidents;

applying the one or more pre-trained AI models to the extracted features, to produce a computer-system-specific prioritization;

presenting the computer-system-specific prioritization to a user of the computer system;

receiving user feedback that is indicative of a quality of the computer-system-specific prioritization, as decided by the user of the computer system; and adjusting subsequent extraction of the features, for the computer system, based on the user feedback.

7. The apparatus according to claim 6, wherein, in running the iterative process, the one or more processors are configured to produce different computer-system-specific prioritizations for different ones of the computer systems, in spite of using the same one or more pre-trained AI models.

8. The apparatus according to claim 6, wherein the one or more processors are configured to assign respective precision measures to one or more of the features, and to adjust the subsequent extraction of the features by adjusting the precision measures in response to the user feedback.

9. The apparatus according to claim 6, wherein, for a given computer system in the plurality, the one or more processors are configured to adjust the subsequent extraction of the features based on both (i) the user feedback received for the given computer system, and (ii) the user feedback received for one or more other computer systems in the plurality.

10. The apparatus according to claim 9, wherein the one or more processors are configured to prevent distortion in the feature extraction of a given computer system due to the user feedback in another computer system.

11. A computer software product, the product comprising a tangible non-transitory computer-readable medium in which program instructions are stored, which instructions, when read by one or more processors, cause the one or more processors to:

maintain one or more pre-trained Artificial Intelligence (AI) models that, when applied to features extracted from computer-system security incidents, produce a prioritization among the security incidents; and for each computer system among a plurality of computer systems, run an iterative process that includes:

detecting one or more security incidents occurring in the computer system;

extracting features from the detected incidents;

applying the one or more pre-trained AI models to the extracted features, to produce a computer-system-specific prioritization;

presenting the computer-system-specific prioritization to a user of the computer system;

receiving user feedback that is indicative of a quality of the computer-system-specific prioritization, as decided by the user of the computer system; and adjusting subsequent extraction of the features, for the computer system, based on the user feedback.

12. The computer software product according to claim 11, wherein the instructions cause the one or more processors to produce different computer-system-specific prioritizations for different ones of the computer systems, in spite of using the same one or more pre-trained AI models.

13. The computer software product according to claim 11, wherein the instructions cause the one or more processors to assign respective precision measures to one or more of the features, and to adjust the subsequent extraction of the features by adjusting the precision measures in response to the user feedback.

14. The computer software product according to claim 11, wherein, for a given computer system in the plurality, the instructions cause the one or more processors to adjust the subsequent extraction of the features based on both (i) the user feedback received for the given computer system, and (ii) the user feedback received for one or more other computer systems in the plurality.

15. The computer software product according to claim 14, wherein the instructions cause the one or more processors to prevent distortion in the feature extraction of a given computer system due to the user feedback in another computer system.

* * * * *